(No Model.)

N. W. WORTHAM & J. I. J. BELL.
ANIMAL TRAP.

No. 352,598. Patented Nov. 16, 1886.

Attest:
Court A Cooper,
H. T. Chapman

Inventor:
Nosley W. Wortham
James I. J. Bell,
By Foster & Freeman
attys.

UNITED STATES PATENT OFFICE.

NOTLEY W. WORTHAM AND JAMES I. J. BELL, OF MONROE, GEORGIA.

ANIMAL-TRAP.

SPECIFICATION forming part of Letters Patent No. 352,598, dated November 16, 1886.

Application filed April 19, 1886. Serial No. 199,396. (No model.)

*To all whom it may concern:*

Be it known that we, NOTLEY W. WORTHAM and JAMES I. J. BELL, citizens of the United States, and residents of Monroe, county of Walton, and State of Georgia, have invented certain new and useful Improvements in Animal-Traps, of which the following is a specification.

Our invention relates to that class of animal-traps in which tilting or pivoted platforms are employed to precipitate the animal into a suitable receptacle, from which the entrapped animal may pass to side compartments; and it consists in the arrangements and combinations of parts, as hereinafter described.

Figure 1:
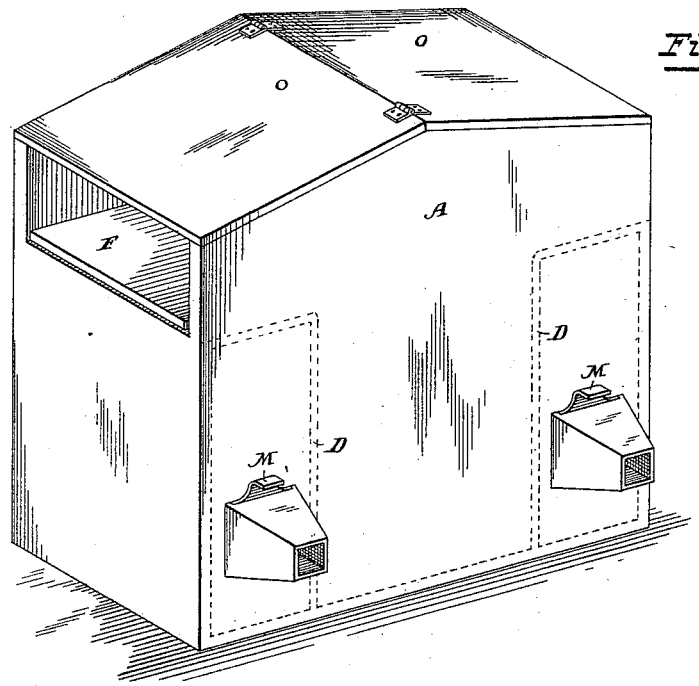
Figures 2, 3:
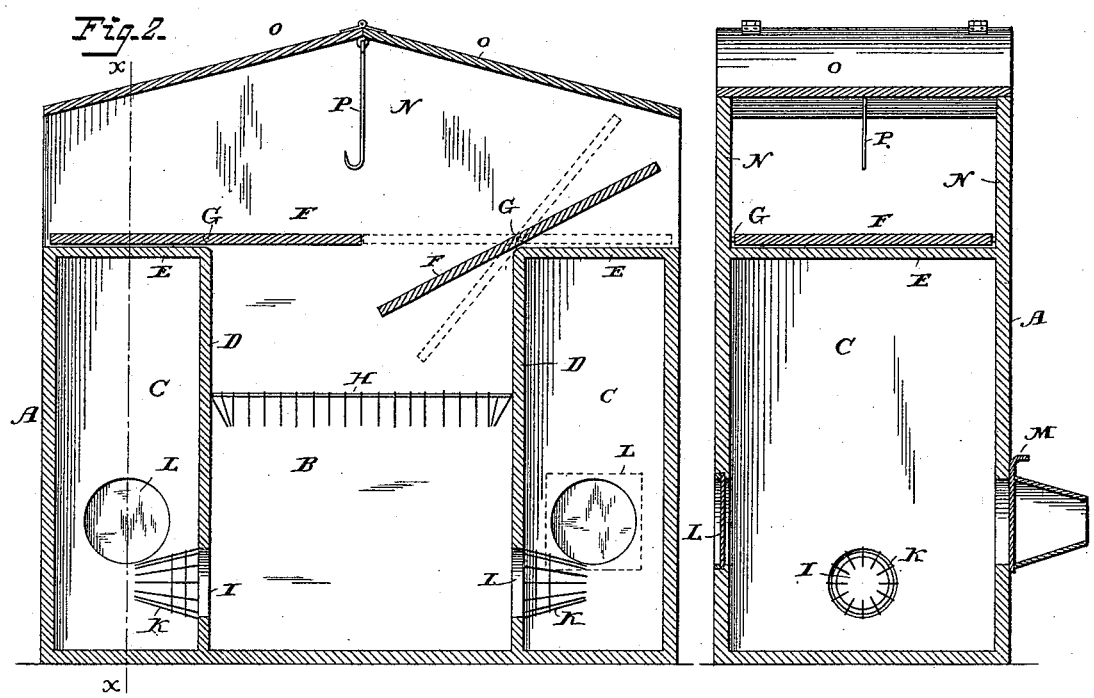

In the drawings, Figure 1 represents a perspective view of the trap. Fig. 2 represents a longitudinal vertical section of the trap, and Fig. 3 a section through *x x* of Fig. 1.

In traps of the class illustrated it has been usual to form the same with a main dark compartment for receiving the animal directly from the tilting platforms, and separate or distinct from the main portion or body of the trap receptacles or compartments into which light is admitted, to entice the entrapped animal into them, and in some instances the compartments have been formed in the body of the trap; but the partitions forming said compartments have been hinged together and connected to move during the operation of the trap. Such traps are objectionable in being more or less cumbersome and complicated in construction. To simplify the same, we use a single box or inclosure of any suitable material—such as wood or metal, or metal-lined wood—divided by fixed partitions into two or more compartments, and preferably consisting of a large central compartment and two smaller side compartments, the latter being permanently covered. The central compartment has its upper end normally closed by tilting platforms pivoted at the upper corners of the smaller compartments and extending over the latter. The ends of the trap-body are continued upward and support the roof, which preferably slants each way from the center, and has one side hinged to the other, so that it may be lifted and expose the bait-holder, hung from the ridge of the said roof, when it is desired to replenish the same or for other purposes. The said roof is placed sufficiently above the main portion or body of the trap to leave a space for the passage of an animal to the bait.

The interior of our trap is so arranged that the animal can approach quite near the bait before the platform will tilt, and the said animal will be on the said platform from the time it enters the said trap till it is precipitated into the receiving-compartment, thereby allaying suspicion which would be aroused by joints or spaces within the trap, while the platform, by being properly proportioned as to weight, will quickly assume its normal position.

When once in the trap, the animal is prevented from escaping should the platforms be accidentally caught in the tilted position by a row of downwardly-projecting wires extending around the compartment below the limit of the downward travel of the platforms.

When once within the dark compartment, the animal is attracted to one or the other of the side compartments by light admitted thereto through glass-covered openings, and is prevented from returning to the dark compartment by converging wires surrounding the passage from the said dark compartment to the side compartment. The wire guard is employed as it does not obstruct the light.

To remove the animals from the trap, we provide the side compartments with sliding doors.

Referring to the drawings, A designates the body of the trap, B the central or dark compartment, C C the side compartments formed by the fixed partitions D D, and covered by the fixed pieces E E.

F F are the tilting platforms pivoted at or near the upper corners of the compartments C C, as shown at G G, and extending from the center of the compartment B to the edges of the trap, but not extending beyond the same. These platforms may be weighted at their outer ends, if desired, to counterbalance the weight of the animal until the bait is nearly reached.

H is the row of downwardly-projecting wires arranged around the compartment B just below the lowest point reached by the platforms F.

I I are the passages from the compartment

B to each of the compartments C, and K the wire guards preventing the return of the animal.

L is the glass panel in one side of each of the compartments C for the entrance of light, and M the door or slide on the opposite side of each of said compartments for the removal of the animal. A short tapering tube directs the animal from the passage covered normally by the door to any suitable receptacle or conveyance for carrying away the said animal from the trap.

N N are the upwardly-continued sides of the the trap; O O, the roof supported thereby and having one side hinged, and P the depending bait-holder hung from the ridge of said roof.

The trap having been properly baited and some object placed near the trap, so that the animal may easily reach the platforms, which latter, extending from the edge of the trap to the center, will not be liable to make the animal as cautious as it would be should it see joints caused by tilting platforms meeting fixed platforms or mechanism connected therewith. Having passed over a portion of the platform without accident, the animal is emboldened to approach the bait, and when near the same the inner end of the platform falls and the animal is precipitated into compartment B. Seeing light in the side compartments, the animal will pass into one of them and there remain until removed, being unable, because of the wire guards, to return to the central compartment.

We claim—

1. An animal-trap having a body containing a dark main receiving-compartment, and closed side receiving-compartments, to which light is admitted, leading from the main compartment and formed by fixed partitions, and cover-pieces within the body, tilting platforms extending from the edges only of the trap over the side and main compartments, a roof supported by upward extensions of the sides of the trap and having one side hinged, and a bait-holder under said roof, substantially as described.

2. An animal-trap having a body containing a dark main receiving-compartment, and closed side receiving-compartments, to which light is admitted, formed by fixed partitions and cover-pieces within the body of the trap, the said side compartments leading from the main compartment, platforms pivoted above and extending over the compartments to the edges only of the trap, a row of downwardly-projecting wires around the sides of the compartment, guarded passages leading from the main to the side compartments, and guarded openings in the side compartments for the admission of light, substantially as described.

In testimony whereof we have signed our names to this specification in the presence of two subscribing witnesses.

NOTLEY W. WORTHAM.
JAMES I. J. BELL.

Witnesses:
THOMAS BAILY,
L. SCHEVENELL.